(12) United States Patent
Wisnovsky et al.

(10) Patent No.: US 9,111,031 B2
(45) Date of Patent: Aug. 18, 2015

(54) METHOD AND SYSTEM FOR SIMULATING AND ANALYZING CODE EXECUTION IN AN ON-DEMAND SERVICE ENVIRONMENT

(75) Inventors: Peter S. Wisnovsky, Oakland, CA (US); Taggart C. Matthiesen, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 926 days.

(21) Appl. No.: 12/943,212

(22) Filed: Nov. 10, 2010

(65) Prior Publication Data

US 2011/0258603 A1 Oct. 20, 2011

Related U.S. Application Data

(60) Provisional application No. 61/324,940, filed on Apr. 16, 2010.

(51) Int. Cl.
*G06F 9/44* (2006.01)
*G06F 11/36* (2006.01)

(52) U.S. Cl.
CPC ........ *G06F 11/3612* (2013.01); *G06F 11/3664* (2013.01); *G06F 11/3668* (2013.01)

(58) Field of Classification Search
CPC ............ G06F 11/3664; G06F 11/3696; G06F 11/3688; G06F 9/455; G06F 9/4443; G06F 11/3668; G06F 17/5009; G06F 11/0709
USPC .................................................. 717/124–135
See application file for complete search history.

(56) References Cited

U.S. PATENT DOCUMENTS

| | | | |
|---|---|---|---|
| 5,574,854 A * | 11/1996 | Blake et al. ..................... 714/28 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,492 B1 * | 11/2001 | Rowe ............................. 703/13 |
| 6,324,568 B1 | 11/2001 | Diec | |

(Continued)

*Primary Examiner* — Lewis A Bullock, Jr.
*Assistant Examiner* — Tina Huynh
(74) *Attorney, Agent, or Firm* — Blakely, Sokoloff, Taylor & Zafman LLP

(57) ABSTRACT

In accordance with embodiments, there are provided mechanisms and methods for simulating and analyzing code execution in a multi-tenant environment. These mechanisms and methods for simulating and analyzing code execution in a multi-tenant environment can enable embodiments to provide an improved interface for analyzing the performance of application on the multi-tenant database. The ability of embodiments to provide better analysis of simulated execution can enable higher quality application developed in less time.

19 Claims, 10 Drawing Sheets

(56) References Cited

U.S. PATENT DOCUMENTS

| | | | |
|---|---|---|---|
| 6,324,693 | B1 | 11/2001 | Brodersen et al. |
| 6,336,137 | B1 | 1/2002 | Lee et al. |
| D454,139 | S | 3/2002 | Feldcamp |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,738,778 | B1 * | 5/2004 | Williamson et al. ............ 1/1 |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker et al. |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,340,411 | B2 | 3/2008 | Cook |
| 7,620,655 | B2 | 11/2009 | Larsson et al. |
| 7,774,172 | B1 * | 8/2010 | Yunt et al. ............ 703/2 |
| 8,015,552 | B1 * | 9/2011 | Lindahl et al. ............ 717/128 |
| 2001/0044791 | A1 | 11/2001 | Richter et al. |
| 2002/0022986 | A1 | 2/2002 | Coker et al. |
| 2002/0029161 | A1 | 3/2002 | Brodersen et al. |
| 2002/0029376 | A1 | 3/2002 | Ambrose et al. |
| 2002/0035577 | A1 | 3/2002 | Brodersen et al. |
| 2002/0042264 | A1 | 4/2002 | Kim |
| 2002/0042843 | A1 | 4/2002 | Diec |
| 2002/0059558 | A1 * | 5/2002 | Hines ............ 717/103 |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0152102 | A1 | 10/2002 | Brodersen et al. |
| 2002/0157086 | A1 * | 10/2002 | Lewis et al. ............ 717/127 |
| 2002/0161734 | A1 | 10/2002 | Stauber et al. |
| 2002/0162090 | A1 | 10/2002 | Parnell et al. |
| 2002/0165742 | A1 | 11/2002 | Robins |
| 2003/0004971 | A1 | 1/2003 | Gong et al. |
| 2003/0018705 | A1 | 1/2003 | Chen et al. |
| 2003/0018830 | A1 | 1/2003 | Chen et al. |
| 2003/0056199 | A1 * | 3/2003 | Li et al. ............ 717/127 |
| 2003/0066031 | A1 | 4/2003 | Laane |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker |
| 2003/0088545 | A1 | 5/2003 | Subramaniam et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec |
| 2003/0189600 | A1 | 10/2003 | Gune et al. |
| 2003/0191743 | A1 | 10/2003 | Brodersen et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan, Jr. et al. |
| 2004/0199489 | A1 | 10/2004 | Barnes-Leon et al. |
| 2004/0199536 | A1 | 10/2004 | Barnes Leon et al. |
| 2004/0199543 | A1 | 10/2004 | Braud et al. |
| 2004/0230954 | A1 * | 11/2004 | Dandoy ............ 717/124 |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2005/0102583 | A1 * | 5/2005 | Spadari ............ 714/45 |
| 2007/0168984 | A1 * | 7/2007 | Heishi et al. ............ 717/124 |
| 2007/0234294 | A1 * | 10/2007 | Gooding ............ 717/124 |
| 2009/0164979 | A1 * | 6/2009 | Fischer ............ 717/128 |
| 2010/0325540 | A1 * | 12/2010 | Biazetti et al. ............ 715/708 |
| 2011/0173589 | A1 * | 7/2011 | Guttman et al. ............ 717/125 |
| 2011/0197179 | A1 * | 8/2011 | Kratochvil ............ 717/125 |

\* cited by examiner

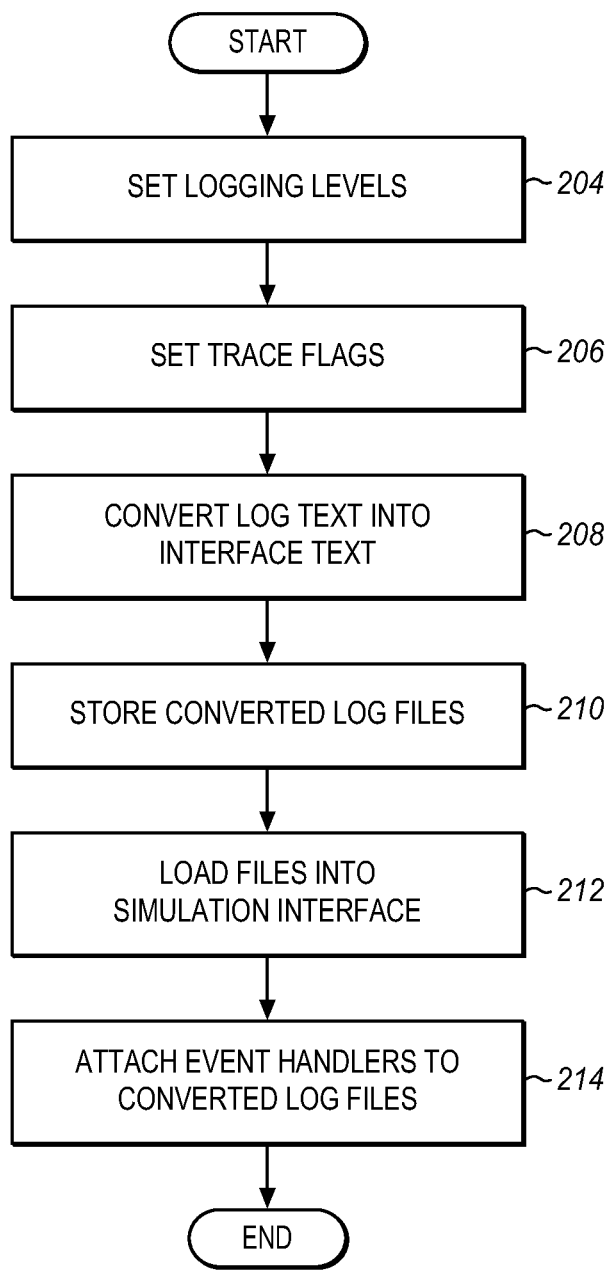

FIG. 3C

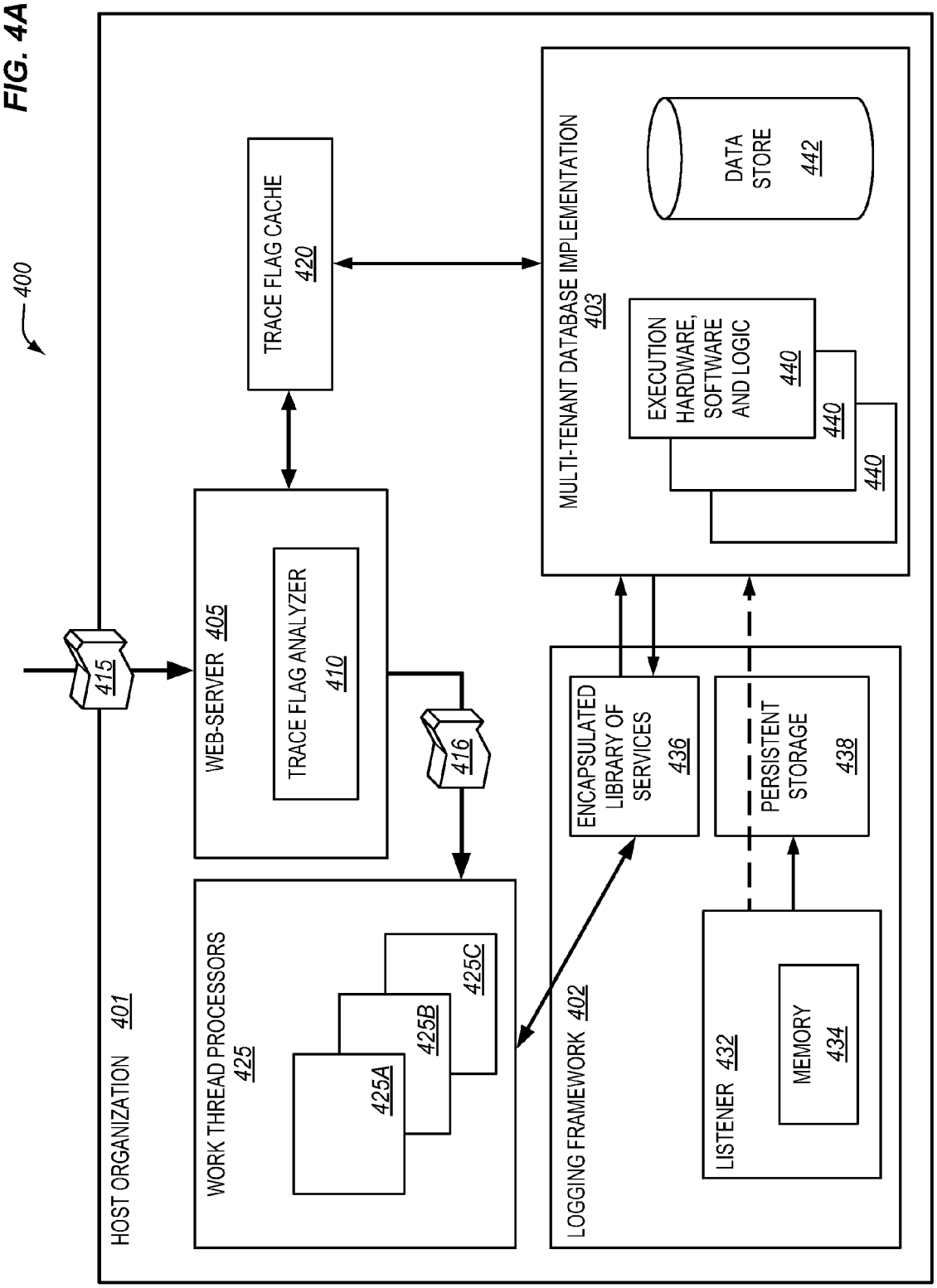

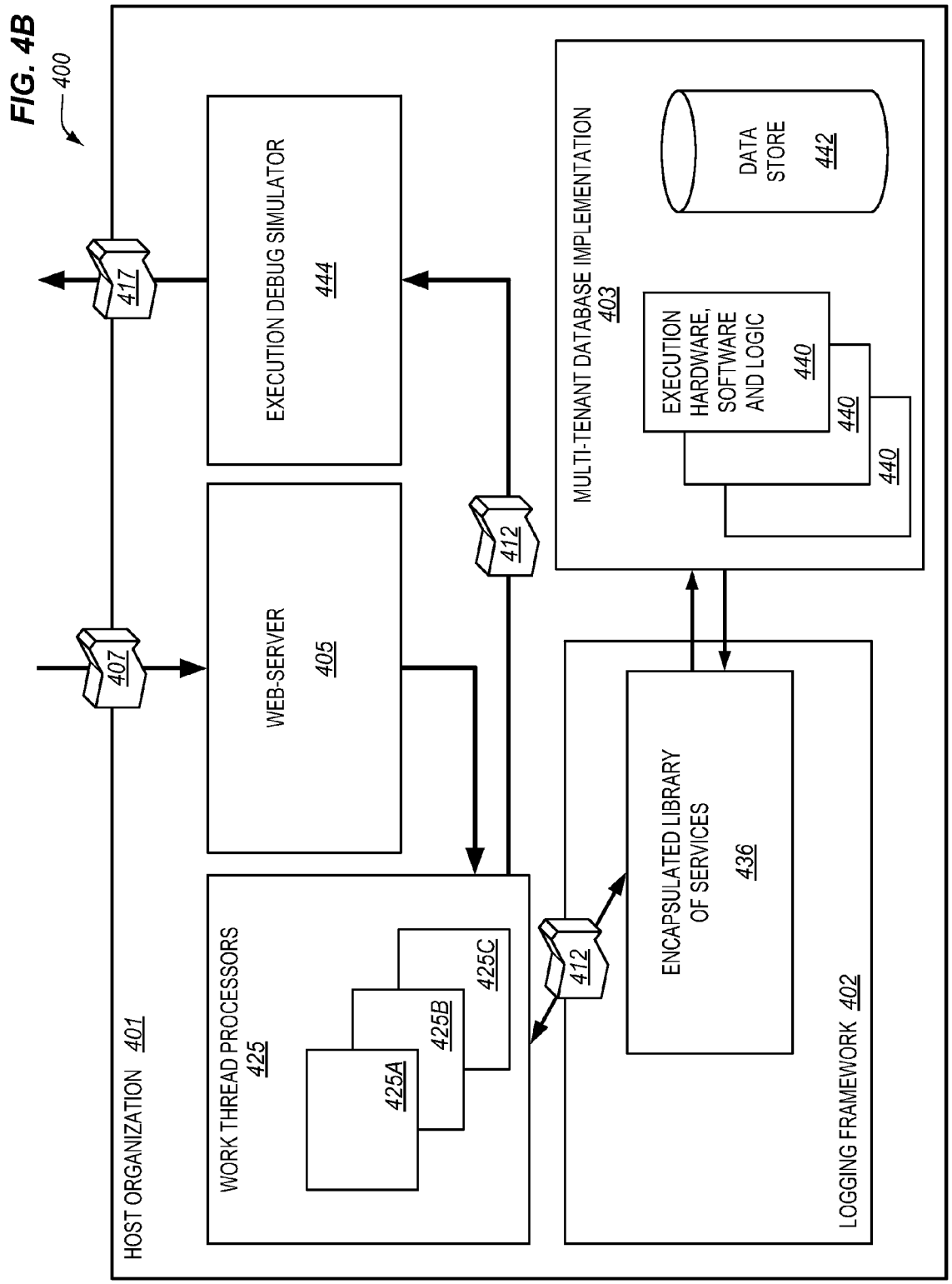

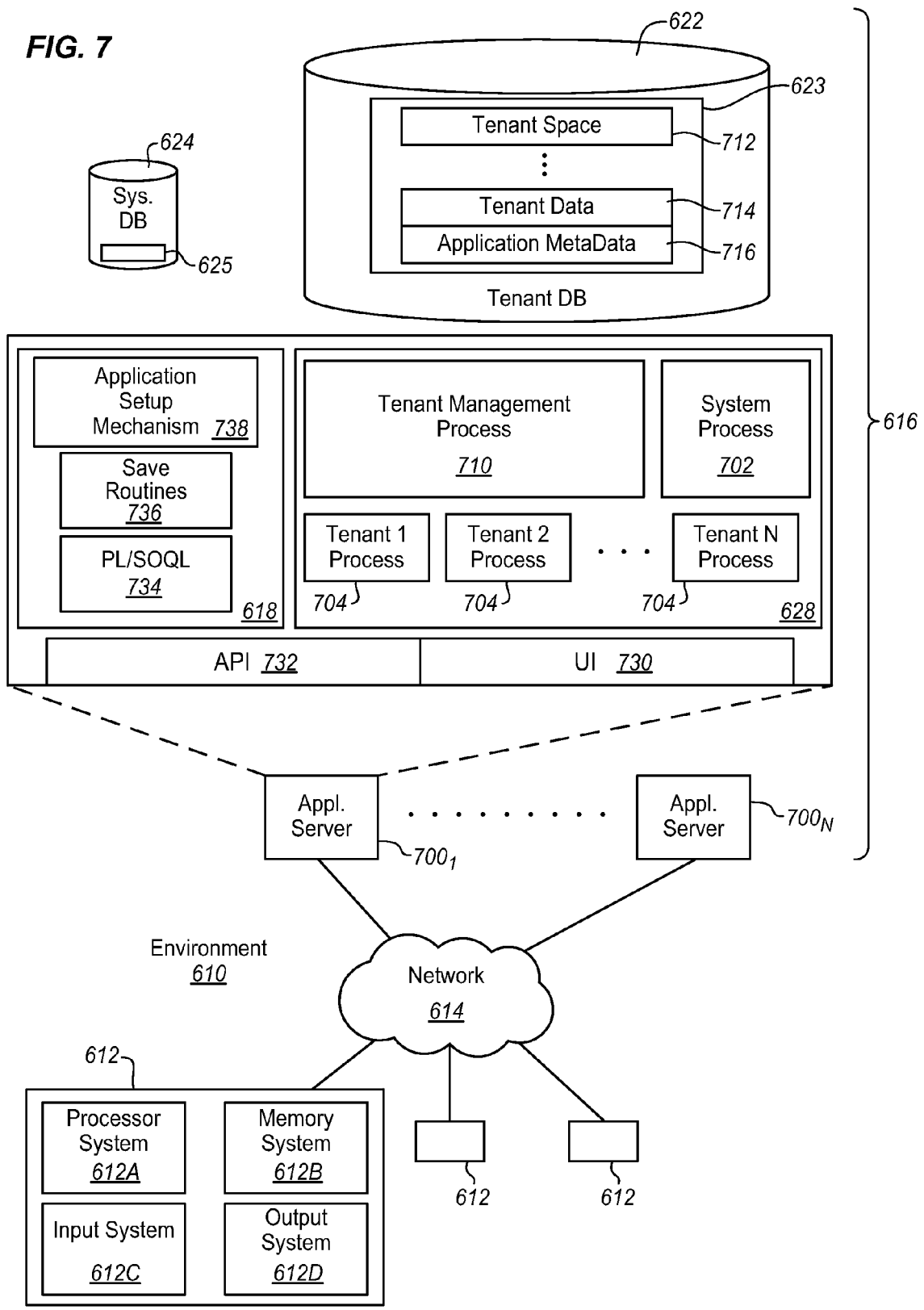

METHOD AND SYSTEM FOR SIMULATING AND ANALYZING CODE EXECUTION IN AN ON-DEMAND SERVICE ENVIRONMENT

CLAIM OF PRIORITY

This application claims the benefit of U.S. Provisional Patent Application 61/324,940 entitled Methods and Systems for Simulating Code in an On-Demand Service Environment, by Wisnovsky et al., filed Apr. 16, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patent applications, including the present application, are related to each other. The other applications is incorporated by reference herein in its entirety:

U.S. patent application Ser. No. 12/883,066 entitled Method and Systems for Debugging Bytecode in an On-Demand Service Environment, by Matthiesen et al., filed Sep. 15, 2010.

FIELD OF THE INVENTION

The current invention relates generally to the field of computing, and more particularly, to methods and systems for debugging byte code in an on-demand service environment in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

The issuance of queries and retrieval of results has limits in ease of use and efficiency for users. Accordingly, database systems allow developers to write software applications in the form of executable code that provide and interface between users and the database. In some cases software development tool kits or packages are made available to assist developers in writing software that is reliable and does not impact the database. Application programming interfaces (APIs) are sometimes provided to allow certain tasks to be automated and to further protect the database from unauthorized software actions.

In a traditional implementation, executable code is authored by a programmer on behalf of a host organization and then executed within that host organization. In such an environment, the host organization may have a "live" or a "production" environment in which executable code is released and serves to fulfill the business objectives of the organization. In such a traditional implementation, the host organization may also utilize a "test" environment or a "sandbox" environment that closely replicates the production environment, but in which unreleased code can be tested for quality and compliance without negatively impacting actual customers of the host organization that are utilizing the production environment.

Before the software is released debugging utilities provide tools to allow the developer to step through the code either line by line, or progressing up to a designated point, at which execution is stopped. This allows the programmer to, for example, analyze the detailed program flow, the status of variables, including their contents and input/output (IO) operations to datastores, databases, memory, or to files, and so forth.

Such debugging utilities require that execution of the codebase being tested be halted, stopped, or paused at specified points as designated by the programmer for further analysis. This interferes with the use of the database by users. In addition, because the debugging utility allows the developer to run the code one step at a time, the code is executed very slowly. This can block access by user for a long time. While debuggers can be operated during off-peak usage times, this is inconvenient for programmers and may not be possible when the user group spans several time zones.

The limits on use and the limited information made available in a step-by-step execution on a debugging utility make software development difficult. Sandbox testing provides helpful results but may not reveal bugs that result with many users and large datasets and with interactions with other programs.

Accordingly, it is desirable to provide techniques enabling an execution stack pane of a simulation interface having hierarchical tree of nodes of operations and an execution log pane coupled to the execution stack pane to improve the ease of analyzing the performance of software applications that might execute on a database system.

BRIEF SUMMARY

In accordance with embodiments, there are provided mechanisms and methods for simulating and analyzing code execution in a multi-tenant environment. These mechanisms and methods for simulating and analyzing code execution in a multi-tenant environment can enable embodiments to provide an improved interface for analyzing the performance of application on the multi-tenant database. The ability of embodiments to provide better analysis of simulated execution can enable higher quality application developed in less time.

In an embodiment and by way of example, a method for simulating and analyzing code execution in a multi-tenant environment is provided. A simulation interface embodiment includes an execution stack pane having a hierarchical tree of operations performed in the simulation of the execution of a software application; and an execution log pane having a log of events during the simulated execution, the execution log pane being coupled to the execution stack pane so that upon the selection of a node in the execution stack pane, a corresponding event in the execution log pane is highlighted and so that upon the selection of an event in the execution log pane, a corresponding node in the tree of the execution stack pane is highlighted.

While the present invention is described with reference to an embodiment in which techniques for simulating and analyzing code execution in a multi-tenant environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 2 is an operational flow diagram illustrating a high level overview of generating a code execution simulation interface in an embodiment;

FIGS. 3A-3C are screen shots illustrating an example user interface screen supporting techniques for simulating and analyzing code execution in an embodiment;

FIG. 4A illustrates a representative architecture in which a logging framework can be generated in an embodiment;

FIG. 4B illustrates an alternative representative architecture in which a logging framework can be generated by simulation in an embodiment;

FIG. 7 illustrates a block diagram of an embodiment of elements of FIG. 6 and various possible interconnections between these elements.

DETAILED DESCRIPTION

General Overview

Figure 1:
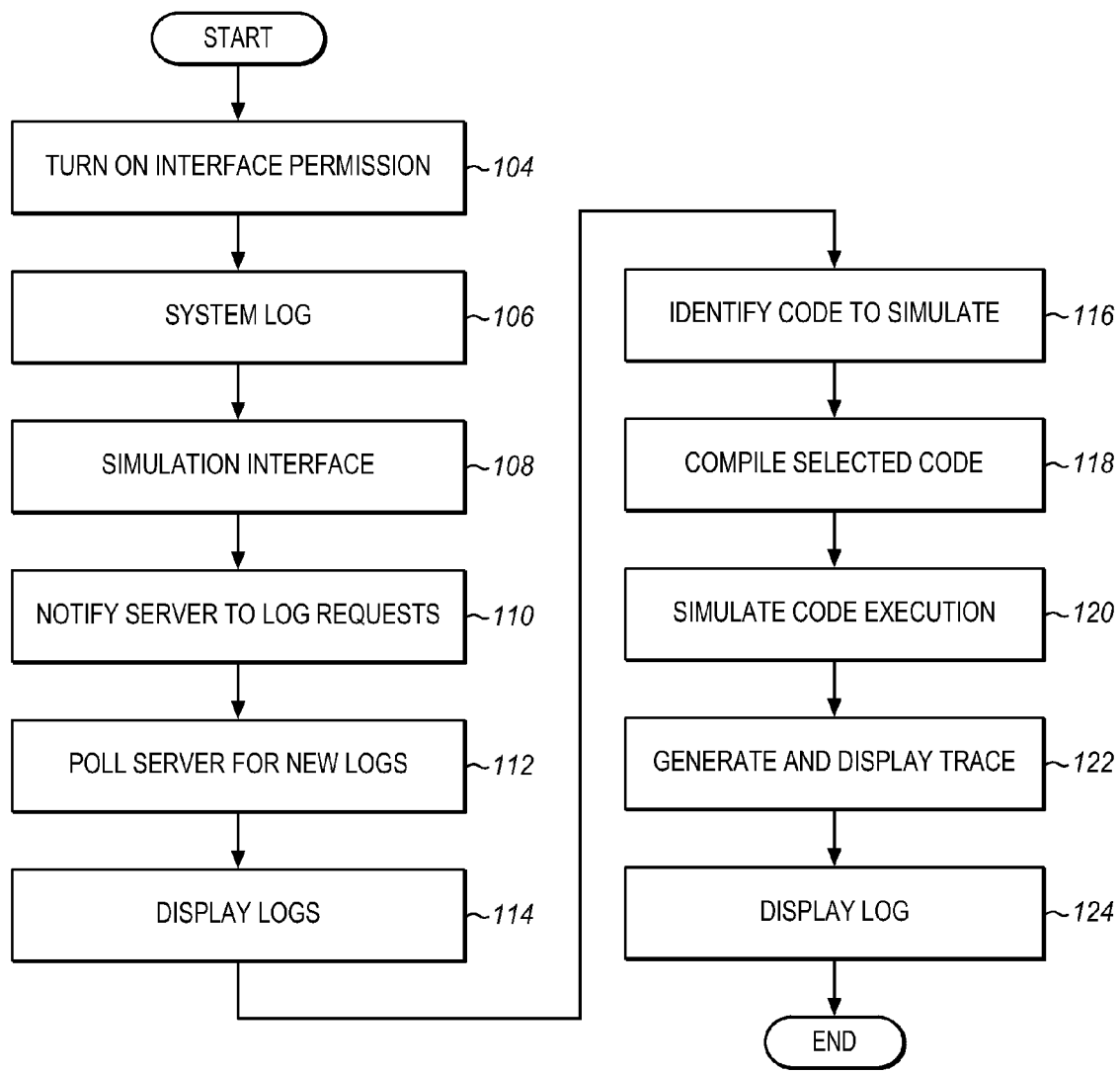
FIG. 1 is an operational flow diagram illustrating a high level overview of simulating and analyzing code execution in an embodiment.

Systems and methods are provided for simulating and analyzing code execution in an on-demand service environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for simulating and analyzing code execution in an on-demand service environment will be described with reference to example embodiments. One embodiment of the invention provides, an Apex Code-execution simulation interface. Apex code is a programming language developed by Salesforce.com, inc. to allow applications to run directly on a multi-tenant database system. However, embodiments of the present invention can be adapted to support a variety of different programming languages. The execution simulation interface is a forensic tool provided to developers of applications to provide a post-mortem execution log analysis. The interface provides views of profiling information and source code, and lets a developer step through an execution trace in the manner of a debugger.

Operational Flow

In one embodiment, to use the interface of the present invention, a developer turns on the execution simulation interface organizational permission in the user interface tab. This is indicated as block 104 in the process flow diagram of FIG. 1. Alternatively, the interface may be enabled in a different manner.

In one embodiment, turning on the execution simulation interface causes a system to bring up a system log window to display a system log as indicated at block 106. A further link, control, or button may be provided to activate the execution simulation interface. Clicking on this further link can then take the developer to an execution simulation interface page as indicated at block 108. The interface can be launched in a variety of different ways. In one example, the interface can be activated automatically by setting user preferences. In another example, the interface can be launched by another application or manually by the user.

Before or after the execution simulation interface has been activated and presents an open display or window, at block 110, a server can be notified that the developer wants requests to be logged. In other words, the server is notified that every operation requested of the server by the application should be logged. At block 112, the server can be polled at the same time or later for new logs. The logs can then be displayed in the execution simulation interface 114. There are a variety of different types of displays that can be used. Some examples are provided in the figures below. In one embodiment, new logs appear in a "Logs" pane at the top of the interface. Other configurations may also be supported.

In order to simulate the execution of code on the Apex, or some other, programming interface, the developer identifies code for simulated execution at block 116. This is the code that will be tested through the simulation interface. The selection of the code can be done in a variety of different ways. In one embodiment, to execute some code directly, the developer may click on a text field in the upper left hand corner of the execution simulation interface window (see FIGS. 3A, 3B, 3C, described below). In this example, a message box or dialog box can appear. Clicking "Execute" or a similar radio button will cause the selected code to be compiled at block 118 and executed at block 120 in simulation.

Alternatively, the developer can simply enable the log and then test actions directly using the simulation interface. In one embodiment, the log will consume the selected actions and provide log entries for the events corresponding to the selected or requested actions.

Simulating the code execution generates a trace for each of the operations and a log. The resulting trace can be loaded and displayed into a trace execution simulation interface window at block 122. In addition, the log can be loaded and displayed in a log window of the simulation interface at block 124.

The execution simulation interface can be operated from a logging infrastructure. If all operations are logged and the execution simulation interface is operated from this infrastructure, then the log can include events related to the code together with other events. The non-code log content can be interleaved with code related log content for storage and display. This approach also allows existing structures to be reused. In one example, the execution simulation interface can scan the log to build up data structures that model the simulated execution of the selected code.

FIG. 2 is a process flow diagram indicating operations that may be performed to generate data that can be displayed on the execution simulation interface. In FIG. 1, the server is polled for new logs from which activity information can be extracted at block 112. This information is then displayed at block 114. In between these operations, the data from the logs can be converted, processed, annotated, and stored in any of a variety of different ways, depending on the nature of the logs, the display interface and the systems upon which the system operates. One example of such operations is diagrammed in FIG. 2.

The features to be displayed and stored for the execution simulation interface can be selected in advance by setting logging levels or by default logging levels. This is indicated in the process flow diagram of FIG. 2 at block 204. In one example, the logging levels can set whether timings, method entry and exit, and statement level tracing are turned on and to whether there are type or threshold requirements for each. In another operation or in the same operation, trace flags can be set by the developer at block 206. In one example, a filter window can be accessed by clicking a "Filters" button in execution simulation interface. This button can be located in any convenient location of the interface in a setup screen, a main display screen, or any other screen.

In one embodiment, the execution simulation interface works by lexically converting selected log text into a new set of simulation interface text files at block 208. These files can be stored in the same or another server, for example an API Cursor Store (ACS) server, in any of a variety of different formats that are readable by the interface at block 210. Generating unique files for the execution simulation interface allows the interface to run more quickly and without interfering with the original log files. In another embodiment, the logs are not copied. The original logs are directly accessed to display and use in the simulation interface.

In one example, the simulation interface text files are generated by converting the log files into tabular JavaScript Object Notation (JSON) structures. These structures are then serialized in text. These text files can then be loaded into a page implemented in Ext, which loads these tables into Ext stores at block 212. The Ext stores are used to back grid panels with the relevant content. In one embodiment, once the stored text files are loaded into the simulation interface, they can be deleted. Event handlers can be attached to the Ext stores for navigating the source at block 214. Once the data is loaded, the request log can be navigated without any further requests to the server, apart for polling for new logs.

The particular structure of the loaded files can be adapted to suit any of a variety of different applications. The Ext stores can contain several different types of files. One or more of the stores listed below can be included in the Ext store.

A step store stores the log lines themselves, with cross references to the source files, line number, and to the current frame.

A source store stores the lines of available source code. A filter is applied to only show the sources of the currently selected log line.

A log store stores the retrieved log descriptors. These descriptors (but not the log content) are populated by the poll task.

A method store stores the executed scopes and profiling information.

A frame store stores all the instances of frames pushed onto the stack, as reconstructed from the log, in reverse chronological order. When a log line is selected, the corresponding frame is set as the "bottom" frame, and then the code walks backward to find the parents in the frame store. Also, a tree node is associated with each frame at the time the frame store load is completed, to populate an execution tree.

While the Ext stores above are described in the context of a particular event log for code execution simulation, the content of the stored files can be adapted to suit information available for other types of logs. In addition, different logs can be combined to provide even more information about the simulated execution. The information from the logs can all be stored in the Ext store so that all of the information can be made available to the execution simulation interface.

User Interface

Figure 3A:
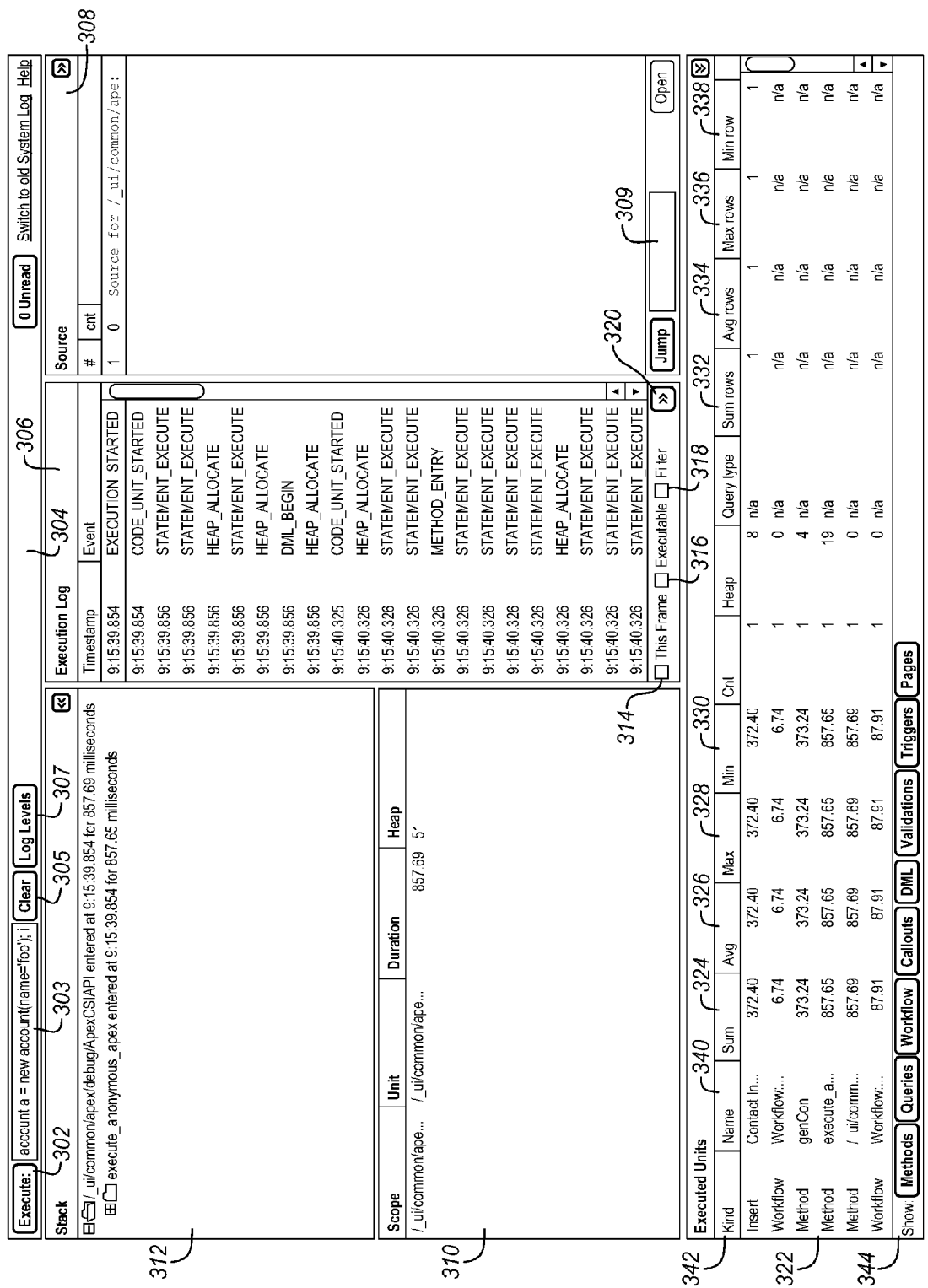

FIG. 3A is a diagram of a display for the execution simulation interface described above. The particular format of the panes, their arrangement and positioning can be modified to suit a variety of different examples. Some panes can be removed and others can be added to show different and additional information. In the displayed interface, the borders of the panes can be resized to allow more and less detail to be shown on each pane.

In the example of FIG. 3A, the panes are interactive to aid a developer in evaluating the available information. The interface includes an upper pane 304 that lists the simulated execution logs that can be loaded. A display window 303 can be completed with a file name for code to be executed or various buttons can be used to navigate and select a file. Upon selecting a program, application, or routine, whether complete or partial, the developer can select an "Execute" button 302. The can be used to cause the interface to issue a command to simulate the execution of the selected file on the server. In order to simplify the user terminal, the simulated execution can be run on the same server that holds the live data. Alternatively, a simulation server can be provided. For ready access, the simulation can be performed by the user terminal that produces the user interface on a sample or a full set of the live date on the server.

The upper pane 304 provides other tools to aid in identifying code for simulated execution. In the illustrated example, the code for simulated execution is shown in the display window 303. A Clear button 305 allows the display window to be cleared. The file identified in the display window can then be filled again by direct entry or by selecting a file. A separate log levels button 307 relates to the Execution Log Pane 306 discussed below and allows the detail shown in that pane to be increased or decreased.

A center Execution Log Pane 306 shows the log itself. The log pane provides the raw output for each executed line of code. A Source Pane 308 shown to the right of the Execution Log Pane in the FIG. shows the source code corresponding to the log. The source pane provides a corresponding view of the source for each executed line. Basically, it reflects the source associated with the highlighted log line in the execution of stack pane. Selecting a line of the Execution Log Pane causes the Source Pane to show the corresponding source code, if available, in the source pane. In the illustrated example, the first line of the log is selected "EXECUTION_STARTED". This has caused the highest level source to be shown, the exec anon script. The Source Pane features a Jump box 309. By typing any command, reference, or other text in the box and selecting the Jump button, the display will jump to the next occurrence of the text in the source code list.

The Execution Log Pane features additional features to allow a developer more flexibility in viewing and analyzing a simulated execution. A "This Frame" selection box 314 issues a command to the interface to modify the items displayed in the pane. The log is filtered to show only the log lines for a currently selected frame. A second selection box for "Executable" 316 causes the log to be filtered to show only those entries that correspond to executable actions. A third selection box labeled "Filter" 318 can be used to allow the developer to enter free form text in text entry box (not shown). This causes a command to the interface to filter the log entries based on the text. The event and detail columns of the log are then filtered to display only matching log entries. The filter function can be enhanced using a search language and terminology, depending on the particular application. In a Java implementation as discussed above, entering a well formed javascript object notation object with column references can be used to allow a developer to perform exact match filtering on multiple columns on the log.

An additional box 320 is shown to indicate that there are more selection boxes to the right of those shown. In the illustrated example, the box shows a right-pointing double arrow quotation mark or Guillemet, however any other notation can be used to suit a desired look and feel. The hidden functions or selections that would be revealed by clicking the additional selection box might include, for example, a "Download" button or buttons (not shown) to allow the developer to download the log file in a raw, filtered, or any other form. This might allow the developer to expose the log to additional development tools.

An upper right pane is a Source Code Pane 308. It can be used to show the source code corresponding to the execution log. This allows a developer to more clearly see the results of the compilation. It also allows the developer to better understand how the program was compiled and executed. The source code display can also be adjusted. In one example, the developer selects a node of the execution log and the corresponding source code is displayed. The source code display can be adjusted by filtering out other code lines, for example, or by scrolling to an appropriate portion of the source code listing. The level of detail and particular format for the Source Code Pane can be adapted to suit any particular application. In one example, instruction classes and triggers and metadata, such as API XML sources can be shown. In addition, validation formulas and workflow rules can be shown if they are desired and available. A more complete display can be used, for example, to observe the execution of code prior to some abnormal event or termination.

FIG. 3A also shows a lower left Stack Backtrace Pane 310 and an Execution Tree or Hierarchical Tree Pane 312. The Stack Backtrace Pane can be used to show details regarding a currently selected line of the Execution Log Pane 306. For the Execution Tree Pane 312, each scope that is entered into the user interface can be shown in sequence as a node in the execution tree. The Execution Tree or Stack Pane provides a hierarchical view of the execution path in the Execution Log Pane. The user interface can provide interactive features between the panes, such as when the developer selects a node, the Source Code Pane is adjusted to scroll to the corresponding line in the source code.

The Execution Tree Pane is particularly useful for showing any aspect of the code that has beginning and ending time points. Apex methods, workflow rules, triggers, page renders, validation rules and more can all be shown in the Execution Tree in a hierarchical representation.

An Executed Units Pane 322, can be used to show profiling information for the scopes entered as part of the request in the upper pane 304. Numeric values such as the execution sum (total) 324, average 326, maximum 328, and minimum 330 times and the row count sum (total) 332, average 334, maximum 336, and minimum 338 times for an identified executed unit 340 can be displayed and sorted in this pane. These times provide the duration for any particular execution unit during the simulated execution. In the illustrated example, a kind 342 is shown for each execute unit entry. These kinds, as well as any of a variety of other parameters can be used to filter the units shown in the pane.

The Executed Units Pane provides summary level information for the simulated execution. This can include the timing of any methods that were invoked. It can include the number of method invocations and the duration of each method. It can include the number of database calls and a variety of other statistical and summary information.

A set of buttons 344 corresponding to different filters is shown. These filter button can be used to command the interface to suppress different kinds of scopes, based upon user selections. These filters are directed to the kinds of execution units and so by selecting "Methods" only method execution units will be shown. Other kinds that can be selected in the example of FIG. 3A include queries, workflow, callouts, DML (Data Manipulation Language), validations, triggers and pages. More or fewer filters may be used to suit a particular application and to suit different types of programming languages.

Clicking on a scope or filter button 344 can cause the execution log to only show the log lines that are part of that scope, where ever and however many times that scope was executed. Such filter can be used, for example, to identify the routines with the highest cost in rows, heap usage or time by sorting and filtering, and then to quickly review the corresponding log entries. After identifying the log entries, the corresponding source code can be reviewed. This can aid in determining how the program might be rewritten or modified for better execution.

Turning from the features of the interface to the operation of the interface, in the example of FIG. 3A, a code file, "account a+new account(name='foo');i . . . ) has been selected and is shown in the display window 303. The Execute command 302 has been entered causing the identified code file to be passed to an execution simulation engine. The execution has been simulated and the execution log 306 shows the events that have occurred during the simulated execution. These events begin with "EXECUTION STARTED" at time 9:15:39.854 and continue through "STATEMENT_EXECUTE" at time 9:15:40.326. By scrolling further down, more logged events can be seen. The Executed Units Pane 322, similar to the Execution Log pane shows all numerical and statistical results for the complete execution log.

The Stack Pane 312 shows an execution tree based on the log. In the illustrated example, a primary folder, ApexCSIAP (Apex Code execution Simulation Interface Application), is opened. This folder corresponds to a system log. It contains a folder, "execute anonymous_apex." This folder contains the details of the execution, but in FIG. 3A has not been opened. This is the highest hierarchical level for the example code. As a result the Source Pane 308 also shows the highest level which is a folder corresponding to the primary folder.

Figure 3B:
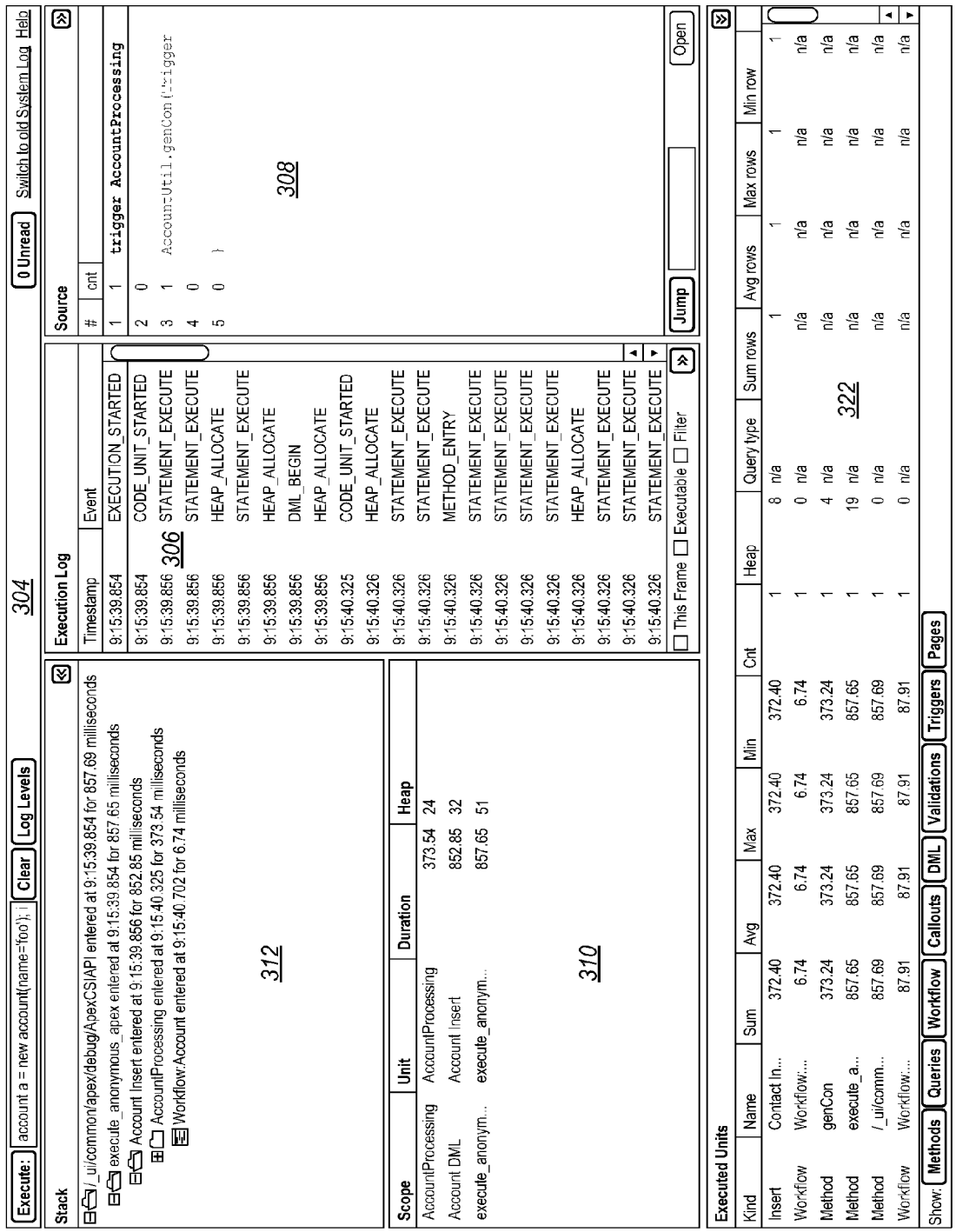

FIG. 3B shows the same interface as in FIG. 3A, with a change in the execution tree. In FIG. 3B, the execute folder has been opened to show the expansion to additional levels. In the execute anonymous apex folder, an Account Insert folder has been opened and in the Account Insert folder, an Account Processing folder has been opened. This folder contains a Workflow Account. The developer can highlight any level in the execution tree to see details for the level in the other panes. In the example of FIG. 3B, the Account Processing folder is highlighted. The Backtrace pane 310 shows stacks all the way from the Account Processing level up to the highest hierarchical level in the Stack pane 312. Similar the Source Pane 308 shows the source code corresponding to the Account Processing trigger. The Execution Log Pane 306 has also changed. It has jumped to the portion of the log corresponding to the Account Processing trigger.

Figure 3C:
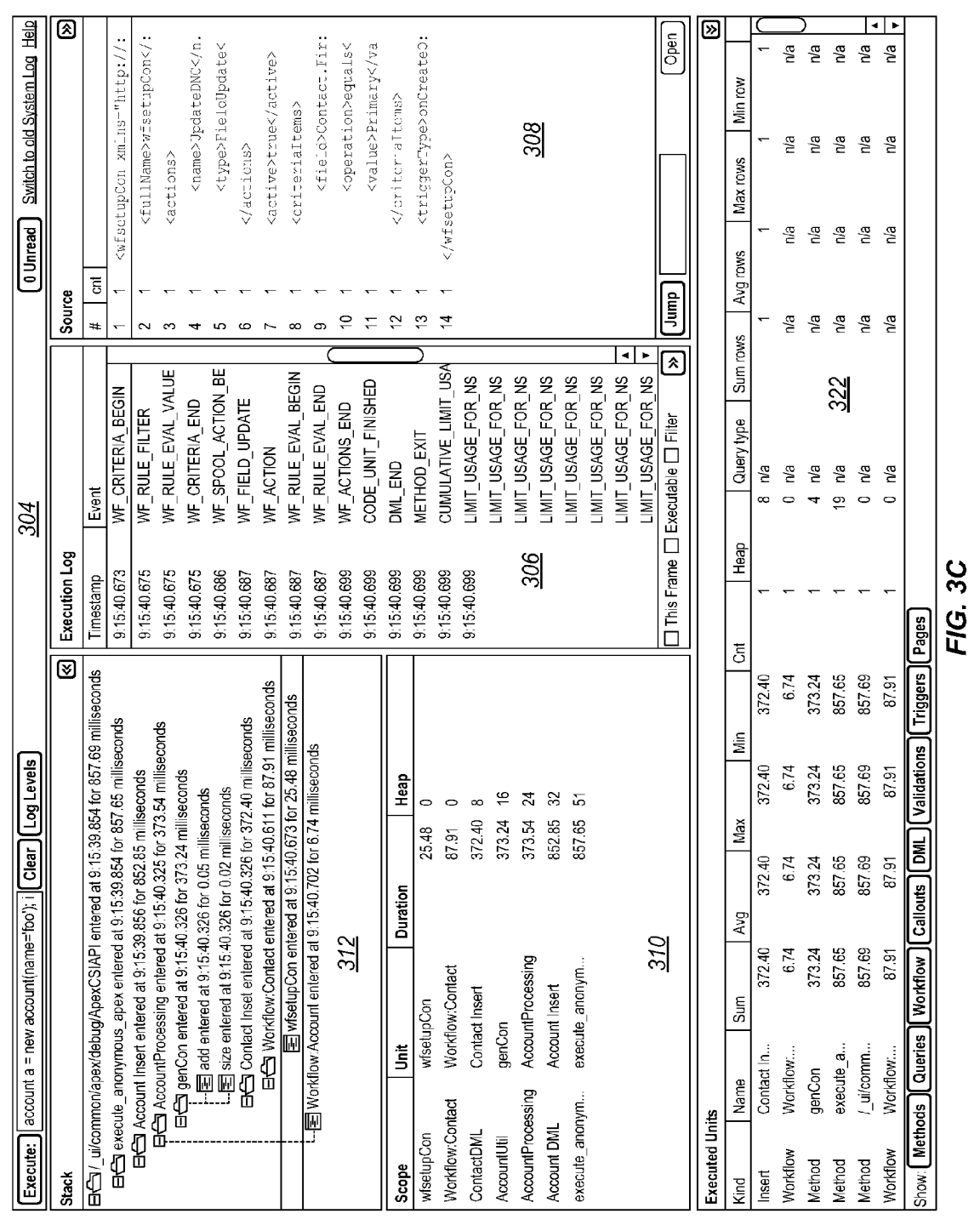

FIG. 3C shows a further development in analyzing the execution of the code. In this example, the developer has navigated through the execution tree to a line, "wfsetupCon" of the execution. This is a much lower hierarchical level of the workflow. The Backtrace Pane shows this level at the top of the pane and allows the developer to walk up the stack from bottom to top, tracing back the operations and the hierarchical levels. Similarly, the Execution Log Pane has jumped to the log events corresponding to this level and the Source Code pane also shows XML (Extensible Markup Language) corresponding to this level of the workflow. The particular format and type of source code will vary depending on the particular application programming environment. In the illustrated example, the lowest level source code is in XML, but this is not necessary to the invention.

The interface of FIGS. 3A, 3B, and 3C allow for a developer to study particular and specific aspects of the simulated execution in detail. The interface also allows the developer to focus on specific detail very quickly. As mentioned above, the statistics in the Executed Units Pane 322 allow the developer to quickly identify anomalous code by its numerical results, such as time of execution or the amount of resources required. The corresponding operations can be navigated toward using the Execution Tree Pane 312. In the Execution Tree Pane, the developer can open and close folders and navigate to any desired part of the execution of the code. The Backtrace Pane 310 provides information about the execution from the perspective of tracing back through the execution and also provides another navigation tool.

The panes of the interface can be interconnected so that if the developer selects a level higher up the stack from the Backtrace Pane, then the Execution Tree Pane 312 highlights the selected level. The Execution Log Pane 306 jumps to the corresponding location in the log and the Source Code Pane 308 shows the corresponding source for the event log. Similarly, when another location is selected in the execution log, the displayed source code will change, the highlighted position in the execution tree will change and the backtrace display will adjust accordingly. In short, the interface allows the developer to select any particular displayed detail in one pane and see the corresponding detail in the other panes. The execution tree shows the developer the hierarchical level of the selected detail in the overall simulated execution.

The power of the interconnections between the panes is further enhanced by the search and filter functions, shown as buttons and text boxes in the illustrated examples. These functions allow the developer to quickly find logged events specific source code instructions, or particular executed units. The developer can select any of these and the other panes adjust to show information corresponding to the selected executed unit, source code or event from the log. The panes can be connected in any of a variety of different ways. External event handlers may be used, for example.

Logging Framework

FIG. 4A illustrates an exemplary architecture 400 in which embodiments of the present invention may operate. Depicted within architecture 400 is a web-server 405 and a trace flag analyzer 410. A network connects a host organization 401 to various customer organizations. The network may include the Internet, Local Area Networks (LANs), Wide Area Networks (WANs), or various combinations of privately accessible network environments and publicly accessible network environments. Some or all of the network connectivity may include a Virtual Private Network (VPN) connection, encrypted tunnels, or may include non-private and non-encrypted connectivity.

In one embodiment, the host organization provides a system for simulating execution debug in a multi-tenant database environment. In such an embodiment, the host organization 401 provides a multi-tenant database implementation 403 in which underlying hardware and software elements implement database functionality and a code execution environment within the host organization 401 and in which the hardware and software elements of the multi-tenant database implementation 403 are separate and distinct from the plurality of customer organizations.

The hardware and software elements of the multi-tenant database implementation 403 include at least a datastore 442 and execution hardware, software, and logic 440. The datastore may be, for example, persistent data storage for storing information on behalf of a database controlled by the execution hardware, software, and logic 440 of the multi-tenant database implementation 403. For example, in one embodiment, a relational database embodied within the execution hardware, software, and logic 440 stores its underlying records, rows, and data structures upon a Storage Area Network (SAN), upon hard disk drives, and/or upon a Redundant Array of Independent Disks (RAID) arrangement of persistent storage devices within data store 442.

Also depicted within Host organization 401 is a logging framework 402 communicatively interfaced to the multi-tenant database implementation. Logging framework 402 includes an encapsulated library of services 436. In one embodiment, the encapsulated library of services 436 provides functionality for interfacing with the multi-tenant database implementation 403 as depicted by the two arrows pointing toward and away from the multi-tenant database implementation 403. In one embodiment, the encapsulated library of services 436 emits execution data describing the execution of events processed via the encapsulated library of services 436, and more specifically, processed via one or more individual services which are embodied within the encapsulated library of services.

Each of the services provide various functional capabilities, such as providing functionality for performing an update, a read, a write, a flush, or a commit operation upon database logic within the multi-tenant database implementation. Each of the various individual services need not have any awareness or internal acknowledgement that they are embodied within the encapsulated library of services, but rather, may function as though they are autonomous library components or individual services.

The encapsulated library of services 436 provides functionality for wrapping the individual services with additional logic (e.g., additional executable code or functionality) that causes executable lines of code and operations performed by the individual services to emit execution data for the various operations taken. For example, in one embodiment, each line of code that is executed within each of the individual services triggers the emission of execution data from the individual service describing one or more of: the line of code that was executed, the result code/error code of the executed line of code, the content of any variable accessed (e.g. instantiated, written to, or read from) by the executed line of code, a customer identifier (UserID) associated with the executed line of code, an Organization identifier (OrgID) associated with the executed line of code, and/or process identifiers/thread identifiers associated with the particular line of code executed.

In certain embodiments, all events (such as every distinctly identifiable line of code that is executed) causes the emissions of execution data from the individual services performing the execution. For example, by forcing all execution to pass through the logging framework 402, and specifically, the encapsulated library of services 436, every single execution event can be forced to emit useful execution data which can then be used to generate a full and complete transcript of execution to be used later for simulating execution debug, as described above. Forcing the emission of execution data does not require or cause execution to be stopped or halted for any user of the system.

In a particular embodiment, host organization 401 receives a request 415, for example, from a customer organization or a developer. In such an embodiment, the request 415 is received at the host organization 401 via web-server 405. In one embodiment, web server 405 provides a web-based interface to a remotely located end-user client machine originating the request (e.g., such as an end-user client device located within a customer organization. The request 415 constitutes a request for services from the multi-tenant database implementation operating within the host organization.

In one embodiment, the web-server 407 contains a trace flag analyzer 410 having functionality to determine whether one or more trace preferences are active for the request. For example, in a particular embodiment, trace preferences are transmitted within the request 415 itself, and the trace flag analyzer 410 extracts the preferences from the request 415 to determine which, if any, trace flags are active for the particular request 415 for services. In an alternative embodiment, trace flags are not encoded within the request 415 for services, and thus, the trace flag analyzer 410 determines which, if any, trace flags are active for the request 415 by fetching the trace flags from the multi-tenant database implementation 403 or from a trace flag cache 420 which is configured to store or cache trace flag preferences to be corresponded or associated with incoming requests 415 from customer organizations.

In a particular embodiment, trace flag analyzer 410 determines that one or more trace preferences are active based on a UserID associated with an incoming request 415. In an alternative embodiment, trace flag analyzer 410 determines that one or more trace preferences are active based on an organization identifier OrgID associated with the request 415. In yet another embodiment, trace flag analyzer 410 determines that one or more trace preferences are active based on a consideration of both the UserID and additionally the OrgID associated with an incoming request 415. In one embodiment, the trace flag analyzer 410 determining that one or more trace preferences are active includes the trace flag analyzer 410 performing one or more of the following operations: (1) comparing a UserID embodied or encoded within the request 415 against a plurality of trace flags cached in a memory of the system, such as within trace flag cache 420; (2) reading the one or more trace preferences for a UserID, OrgID, or both, as embodied or encoded within the request 415, from the multi-tenant database implementation 403 based on the corresponding UserID, OrgID, or both; (3) reading the one or more trace preferences directly from the request 415 received, for example, where the trace flag preferences are encoded directly into the request 415 by the originating end-user machine or the originating client origination; or (4) having the trace flag analyzer 410 correspond the UserID to an OrgID associated with the request 415 and determining the one or more trace preferences specified for the OrgID.

In one embodiment, trace flag cache 420 includes a memory cache which is communicatively interfaced to the multi-tenant database. In one embodiment, the trace flag cache 420 caches a plurality of trace flags persistently stored by the multi-tenant database, wherein each trace flag is associated with either a UserID, an OrgID, or both. In one embodiment, each trace flag cached within trace flag cache 420 indicates a trace preference is active for the associated UserID, and/or OrgID.

Referring back to web-server 405 of FIG. 4A, in one embodiment, web-server 405 receives the request 415 for services from a remotely located end-user client machine (e.g., such as a client device remotely located at a customer organization and then web-server 405 encodes one or more trace flags into the request 415 based on the one or more trace preferences corresponding to a user identifier UserID or an OrgID associated with the request. In one embodiment, web-server 405 then forwards the request 415 having the one or more trace flags encoded therein to one or more work thread processors 425 to process the request 415. For example, request 416 having the one or more trace flags encoded therein is depicted as being forwarded by web-server 405 to one or more of the work thread processors (e.g., 425A, 425B, and 425C) for processing. In such an embodiment, the one or more trace flag preferences do not arrive encoded within request 415, but rather, are looked up and associated by web-server 405, encoded within a modified request 416 having the one or more trace flag preferences injected into the request, and then forwarded for processing, by the work thread processors 425 which in turn may engage logging framework 402 as described above.

Regardless of the manner in which the trace flags are determined to be active for a particular request, the trace flags are eventually relied upon by listener 432 to determine what portion, if any, of execution data emitted from the encapsulated library of services 436 is to be captured and persistently stored for later use. Persistent storage 438 is provided within the logging framework to store the trace flags. As noted above, in certain embodiments, all executable events cause the emission of execution data and this occurs without regard to any particular trace flag being active or inactive. However, in such an embodiment, listener 432 can screen or sift through the execution data cached into its memory 434 and flush or persistently store only those events determined to be of interest based upon the trace flags which are active.

FIG. 4B illustrates an alternative exemplary architecture 400 in which embodiments of the present invention may operate. In one embodiment, host organization 401 includes an execution debug simulator 444 communicatively interfaced with a web-server 405 and work thread processors 425A, 425B, and 425C.

In one embodiment, execution debug simulator 444 accesses the portion of the execution data emitted responsive to the execution of the plurality of events. For example, in one embodiment, a request 407 received at web-server 405 requests an execution debug simulation to be run via host organization 401. In a particular embodiment, web-server 405 forwards the request for execution simulation 407 to work thread processors 425 for processing, which in turn retrieve a transcript of execution events 412 corresponding to a prior request for services (e.g., such as a transcript of execution events 412 corresponding to the processing of request 417 described above which would have been emitted within execution data corresponding to the request). In a particular embodiment, work thread processors 425 then forward the transcript of execution events 412 to execution debug simulator 444 which then sends a response 417 to the requestor, the response 417 containing information necessary to simulate execution debug of the prior request (e.g., request 417).

In one embodiment, execution debug simulator 444 simulates execution of the plurality of events via a graphical user interface communicatively coupled with the execution debug simulator 444, wherein simulating execution of the plurality of events includes at least presenting output corresponding to execution of one or more of the plurality of events based on the portion of execution data emitted and retrieved within the transcript of execution events 412. In such an embodiment, the portion of execution data emitted and retrieved as the transcript of execution events 412 is accessed and retrieved without re-executing any of the plurality of events for the original request (e.g., request 417 described previously).

In one embodiment, execution debug is described as a "simulation" or provided via a "simulator" because standard execution debug operations (e.g., pausing, stopping, or halting operation, analyzing variable inputs/outputs, analyzing command return codes, formed SQL queries, data sets returned subject to SQL queries, etc.) are not performed during execution of the actual request (e.g., 417) causing the execution data to be generated and emitted, but rather, because the transcript of execution events 412 is later retrieved/accessed after the original request (417) has been completed. For example, execution debug simulator 444 can "re-play" or "simulate" the original execution by referencing the persistently stored execution data emitted without requiring that any portion of the original request 417 be re-executed or reprocessed.

Figure 5:
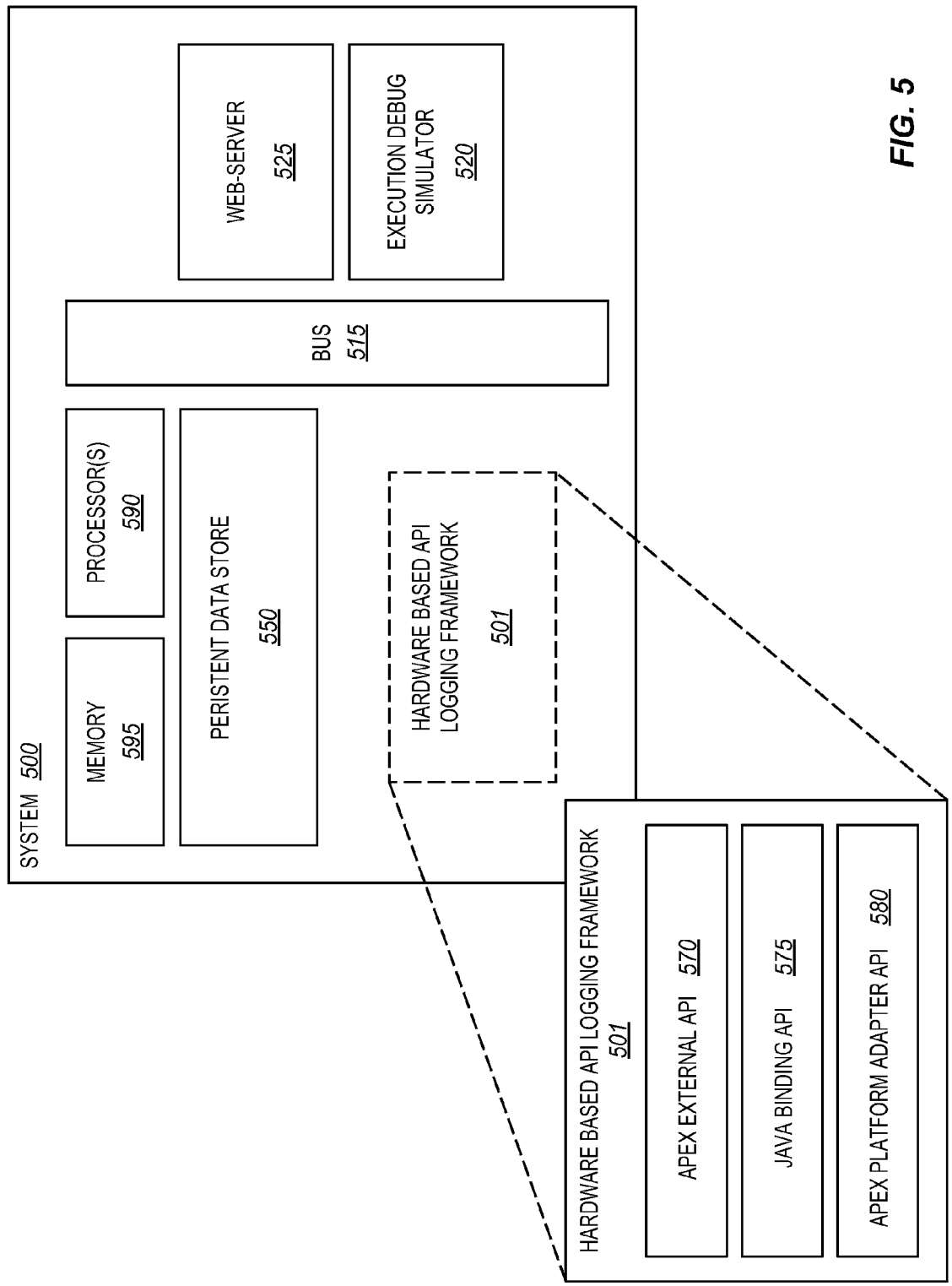
FIG. 5 illustrates a representative system in which embodiments of the invention may operate in an embodiment.

FIG. 5 shows a diagrammatic representation of a system 500 in which embodiments of the invention may operate, be installed, integrated, or configured.

In one embodiment, system 500 includes a memory 595 and a processor or processors 590. For example, memory 595 may store instructions to be executed and processor(s) 590 may execute such instructions. System 500 includes bus 515 to transfer transactions and data within system 500 among a plurality of peripheral devices communicably interfaced with bus 515. System 500 further includes a persistent data store 550 (e.g., a memory, hard drive, multi-tenant database implementation, or a communications path to such a persistent data store or storage location). System 500 further includes web-server 525, for example, to receive requests, return responses, and otherwise interface with remote clients, such as client devices remotely located within remote customer organizations. System 500 is further depicted as having an execution debug simulator 520 therein which has implementing logic to, for example, retrieve execution debug transcripts and provide an execution debug environment, interface, GUI, or services to requesting clients.

A hardware-based API logging framework 501 within system 500 includes Apex External API 570, Java Binding API 575, and an Apex Platform Adapter API 580, having implementing logic thereon. For example, in one embodiment, hardware based API logging framework 501 includes Apex External API 570 that is an outward facing API designed to be consumed (e.g., referenced or accessed) by remote customer organizations (e.g., 105A-C of a host Enterprise Organization (e.g., 401), in which the Apex External API 570 specifies how users within the remote customer organizations soliciting resources from system 500 may access a reference to an Apex type (class or interface), create an instance of the type, and execute methods on the instance, for example, methods or requests that are to be processed via processor(s) 590 and or the work thread processors 425 described previously.

Java™ Binding API 575 or a Java™ compatible Binding API 575 depicted within the hardware based API logging framework 501 extends Apex with capabilities defined by a Java™ compatible programming environment, wherein the Java™ Binding API allows new types to be added to Apex backed by corresponding Java™ types within the Java™ compatible programming environment, and wherein Java™ compatible methods of the Java™ compatible programming environment are enabled to be invoked from within Apex via a type mapping between Apex and the Java™ compatible programming environment. In such an embodiment, the new "types" to be added to Apex and backed by corresponding Java™ types are not specified or natively supported by standard Java™ implementations, but rather, provide and enable new functionality within the described Apex structure as supported by the hardware based API logging framework 501.

In one embodiment, the hardware based API logging framework 501 encapsulates all executable events processed within system 500 thus causing execution data to be emitted by the execution of such events. This execution data may then be utilized by execution debug simulator 520 to provide debug and diagnostic activities without the need to engage or re-execute underlying business logic.

System Overview

Figure 6:
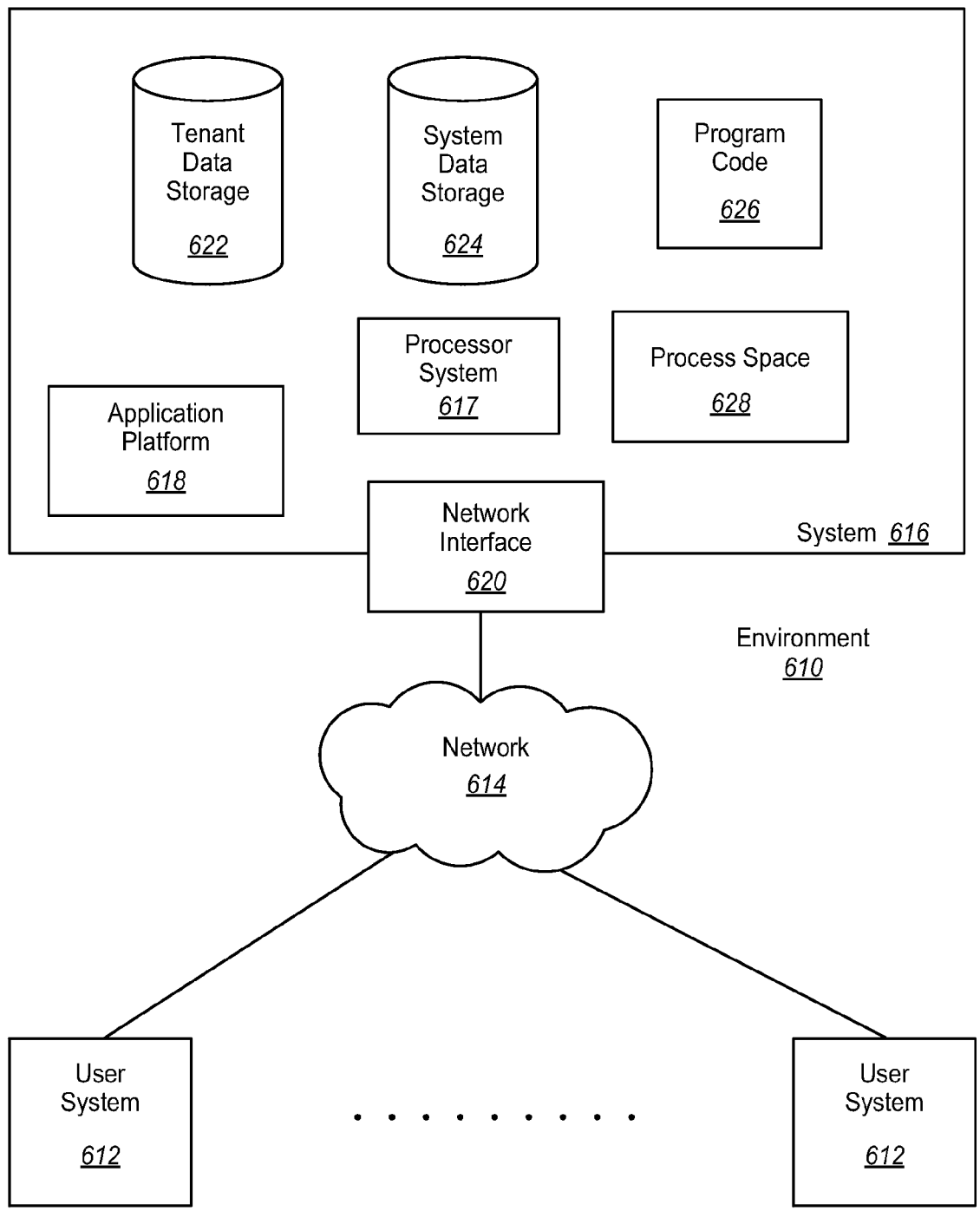
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 100 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 700₁ might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
   polling a server to obtain logs containing text representing logged requests;

displaying an execution log for an execution of a software application in a user interface, the software application being on an application server of a server, the software application to respond to the requests originating from remote client devices;

converting text of the obtained logs to simulation interface text files and storing the simulation interface text files;

displaying an execution tree of the execution of the software application as a simulation of the execution of the software application with the server;

receiving a selection of a hierarchical level in the execution tree for the simulated execution of the software application;

finding an entry corresponding to the selected hierarchical level in the execution log;

simulating execution of the found entry in the execution log;

displaying the execution log and highlighting the found entry; and displaying a backtrace pane having a listing of operations performed during the simulated execution, and tracing operations at nodes of the execution tree in reverse time order in response to the selection of corresponding operations listed in the backtrace pane.

2. The method of claim 1, wherein the execution tree shows operations performed in the simulated execution grouped in accordance with a functional hierarchy.

3. The method of claim 1, wherein the execution tree indicates events logged during the simulated execution.

4. The method of claim 3, wherein the logged events include hardware resource usage events.

5. The method of claim 3, wherein the logged events are each associated with a timestamp.

6. The method of claim 1, further comprising finding a corresponding entry corresponding to the selected hierarchical level in source code corresponding to the simulated execution and displaying the found source code entry.

7. The method of claim 1, further comprising:
determining an active trace flag preference and wherein the obtained logged requests contain only the requests corresponding to the active trace flag preference.

8. The method of claim 7, further comprising:
the software application encoding at least one trace flag into the requests made by the software application to the server and wherein the obtained logged requests correspond to the request having encoded trace flags corresponding to the active trace flag preferences.

9. The method of claim 1, further comprising displaying a source pane having a sequential source code instruction listing to show source code corresponding to the execution log, and upon the selection of an event in the execution log, highlighting a corresponding instruction in the source pane.

10. The method of claim 1, further comprising displaying an executed units pane to show profiling information for the simulated execution of the operations of the execution tree.

11. The method of claim 10, wherein the profiling information includes a duration for the simulated execution of displayed operation.

12. The method of claim 1, wherein displaying the obtained logged requests comprises attaching an event handler to the stored simulation interface text files to navigate the files without requesting additional logged requests from the server.

13. A non-transitory machine-readable medium carrying one or more sequences of instructions for simulating and analyzing code execution in a multi-tenant database system, which instruction, when executed by one or more processors, cause the one more processors to carry out the steps of:

polling a server to obtain logs containing text representing logged requests;

displaying an execution log for an execution of a software application in a user interface, the software application being on an application server of a server, the software application to respond to the requests originating from remote client devices;

converting text of the obtained logs to simulation interface text files and storing the simulation interface text files;

displaying an execution tree of the execution of the software application as a simulation of the execution of the software application with the server;

receiving a selection of a hierarchical level in the execution tree for the simulated execution of the software application;

finding an entry corresponding to the selected hierarchical level in the execution log;

simulating execution of the found entry in the execution log;

displaying the execution log and highlighting the found entry; and displaying a backtrace pane having a listing of operations performed during the simulated execution, and tracing operations at nodes of the execution tree in reverse time order in response to the selection of corresponding operations listed in the backtrace pane.

14. The machine-readable medium of claim 13, wherein the execution tree shows operations performed in the simulated execution grouped in accordance with a functional hierarchy.

15. The machine-readable medium of claim 13, wherein the execution tree indicates events logged during the simulated execution.

16. The machine-readable medium of claim 13, further comprising instructions for carrying out the step of finding a corresponding entry corresponding to the selected hierarchical level in source code corresponding to the simulated execution and displaying the found source code entry.

17. An apparatus for simulating and analyzing code execution in a multi-tenant database, the apparatus comprising:
a processor; and
one or more stored sequences of instructions which, when executed by the processor, cause the processor to carry out the steps of:

polling a server to obtain logs containing text representing logged requests;

displaying an execution log for an execution of a software application in a user interface, the software application being on an application server of a server, the software application to respond to the requests originating from remote client devices;

converting text of the obtained logs to simulation interface text files and storing the simulation interface text files;

displaying an execution tree of the execution of the software application as a simulation of the execution of the software application with the server;

receiving a selection of a hierarchical level in the execution tree for the simulated execution of the software application;

finding an entry corresponding to the selected hierarchical level in the execution log;

simulating execution of the found entry in the execution log;

displaying the execution log and highlighting the found entry; and displaying a backtrace pane having a listing of operations performed during the simulated execution, and tracing operations at nodes of the execution tree in reverse time order in response to the selection of corresponding operations listed in the backtrace pane.

18. The apparatus of claim 17, wherein the stored sequences of instructions further cause the processor to carry out the steps of finding a corresponding entry corresponding to the selected hierarchical level in source code corresponding to the simulated execution and displaying the found source code entry.

19. The method of claim 17, wherein the stored sequences of instructions further cause the processor to carry out the steps of:
   determining an active trace flag preference and wherein the obtained logged requests contain only requests corresponding to the active trace flag preference.

* * * * *